United States Patent
Krishnan et al.

(10) Patent No.: US 11,643,562 B2
(45) Date of Patent: May 9, 2023

(54) ADHESION PROMOTERS FOR UV FLEXOGRAPHIC INKS AND COATINGS

(71) Applicant: SUN CHEMICAL CORPORATION, Parsippany, NJ (US)

(72) Inventors: Ramasamy Krishnan, Carlstadt, NJ (US); Mark Schneider, Carlstadt, NJ (US); David Klein, Carlstadt, NJ (US)

(73) Assignee: Sun Chemical Corporation, Parsippany, NY (US)

( * ) Notice: Subject to any disclaimer, the term of this patent is extended or adjusted under 35 U.S.C. 154(b) by 0 days.

(21) Appl. No.: 17/641,243

(22) PCT Filed: Jul. 9, 2021

(86) PCT No.: PCT/US2021/041012
§ 371 (c)(1),
(2) Date: Mar. 8, 2022

(87) PCT Pub. No.: WO2022/011213
PCT Pub. Date: Jan. 13, 2022

(65) Prior Publication Data
US 2022/0275224 A1 Sep. 1, 2022

Related U.S. Application Data

(60) Provisional application No. 63/050,174, filed on Jul. 10, 2020.

(51) Int. Cl.

| | |
|---|---|
| *C09D 11/101* | (2014.01) |
| *C08K 5/521* | (2006.01) |
| *C09D 11/102* | (2014.01) |
| *C09D 4/06* | (2006.01) |
| *C08F 222/10* | (2006.01) |
| *C08F 2/50* | (2006.01) |
| *C08L 75/04* | (2006.01) |
| *C09D 11/107* | (2014.01) |
| *C09D 11/38* | (2014.01) |

(52) U.S. Cl.
CPC .............. *C09D 11/101* (2013.01); *C08F 2/50* (2013.01); *C08F 222/1067* (2020.02); *C08K 5/521* (2013.01); *C08L 75/04* (2013.01); *C09D 4/06* (2013.01); *C09D 11/102* (2013.01); *C09D 11/107* (2013.01); *C09D 11/38* (2013.01); *C08L 2201/54* (2013.01)

(58) Field of Classification Search
CPC ...... C09D 11/101; C09D 4/06; C09D 11/102; C09D 1/107; C09D 11/38; C09D 11/03; C09D 11/033; C08F 2/50; C08F 222/1067; C08K 5/521; C08L 75/04; C08L 2201/54
See application file for complete search history.

(56) References Cited

U.S. PATENT DOCUMENTS

| | | | |
|---|---|---|---|
| 2008/0242757 A1* | 10/2008 | Dvorchak | .......... C08G 18/4288 427/521 |
| 2009/0018230 A1 | 1/2009 | Chisholm et al. | |
| 2011/0159298 A1* | 6/2011 | Nesbitt | .................... C08J 7/043 428/411.1 |
| 2014/0273692 A1* | 9/2014 | Wild | ...................... C09J 133/08 442/151 |
| 2015/0218396 A1 | 8/2015 | Brust et al. | |
| 2018/0371270 A1* | 12/2018 | Graunke | ................... C09J 4/06 |

FOREIGN PATENT DOCUMENTS

| | | | | |
|---|---|---|---|---|
| EP | 1 591 502 A1 | | 11/2005 | |
| EP | 2694602 | * | 2/2014 | ............ C09D 11/00 |
| EP | 2 921 536 A1 | | 9/2015 | |
| WO | WO 2013/019821 | | 2/2013 | |
| WO | WO 2015/140112 | | 9/2015 | |
| WO | WO 2018/136480 | | 7/2018 | |

OTHER PUBLICATIONS

International Search Report issued in International Application No. PCT/US2021/041012, dated Oct. 15, 2021.
Written Opinion of the International Searching Authority issued in International Application No. PCT/US2021/041012, dated Oct. 15, 2021.

* cited by examiner

*Primary Examiner* — Jessica M Roswell
(74) *Attorney, Agent, or Firm* — Marian E. Fundytus; Ostrolenk Faber LLP.

(57) ABSTRACT

The present invention provides water-based energy curable compositions that exhibit improved printability, adhesion, opacity, and wash-up properties. The compositions comprise one or more inert water-based polyurethane resins and one or more water-based phosphate esters. Addition of the inert polyurethane resins and phosphate esters improves adhesion of the energy curable compositions to a variety of substrates.

18 Claims, No Drawings

ADHESION PROMOTERS FOR UV FLEXOGRAPHIC INKS AND COATINGS

CROSS REFERENCE TO RELATED APPLICATIONS

The present application is a § 371 National Phase application based on PCT/US2021/041012 filed 9 Jul. 2021, which claims the benefit of U.S. Provisional Application No. 63/050,174, filed 10 Jul. 2020, the subject matter of each of which is incorporated by reference in their entirety.

FIELD OF THE INVENTION

The present invention is related to water-based energy curable compositions. The compositions comprise water-soluble or dispersible inert polyurethane resins and water-soluble or dispersible phosphate esters. Addition of the inert polyurethane resins and phosphate esters improves adhesion of the energy curable compositions to a variety of substrates.

BACKGROUND OF THE INVENTION

Energy curable inks and coatings typically exhibit very poor adhesion to certain substrate films, including bi-axially oriented polypropylene (BOPP), as well as others. This has presented a problem for use of energy curable ink and coating compositions in flexographic printing.

WO 2018/136480 (EP 3571253) discloses UV-LED curable dielectric inks. Although inert resins may be included in the compositions, inert polyurethane resins are not disclosed. In addition, there is no disclosure of phosphate esters.

US 2009/0018230 is directed to radiation curing inks. These inks do not include inert polyurethane resins.

WO 2012/136588 (EP 2694602) and TW 2012/45866 disclose radiation curable compositions, which may include small amounts of inert polyurethane resins. However, the compositions do not contain phosphate esters.

WO 2013/019821 (EP 2739481) is directed to energy curable high-stretch inks and coatings for heat transfer labels. The inks and coatings may contain inert polyurethane resins. However, there is no disclosure of phosphate esters.

WO 2015/140112 (EP 3119842) discloses radiation curable compositions which may include inert polyurethane resins. However, there is no disclosure of phosphate esters.

Citation or identification of any document in this application is not an admission that such represents prior art to the present invention.

There is still a need for energy curable compositions that exhibit better adhesion to certain film substrates. This is important for flexographic inks and coatings.

BRIEF SUMMARY OF THE INVENTION

The present invention addresses the problem of very poor adhesion of energy curable flexographic inks to certain substrate films, such as BOPP. The inventors have found that addition of a water-soluble or dispersible inert polyurethane resin results in good ink adhesion to BOPP. However, adding too much inert polyurethane resin to the ink results in an ink with poor printability when run on a flexographic press. The inventors have further discovered that addition of a phosphate ester in conjunction with the inert polyurethane resin results in good adhesion to BOPP, while alleviating the print problems associated with too much water-soluble or dispersible polyurethane resin. Both the phosphate ester and the water-soluble or dispersible polyurethane resin are inert, i.e. not photoreactive in the ink/coating system. This combination also gave superior adhesion to polyethylene terephthalate (PET) films. In a preferred embodiment, the water-soluble or dispersible polyurethane resin and water-soluble or dispersible phosphate ester are both incorporated into the energy curable compositions of the present invention, but it would be possible to incorporate either alone to produce improved adhesion and/or opacity.

In a particular aspect, the present invention provides a water-based energy curable composition, comprising:
(a) 1 wt % to 15 wt % total water from all sources, including added water and water from the materials, based on the total weight of the composition;
(b) 1 wt % to 50 wt % one or more energy curable monomers and/or oligomers, based on the total weight of the composition;
(c) 0.1 wt % to 15 wt % one or more water-soluble or dispersible inert polyurethane resins, based on the total weight of the composition; and
(d) 0.1 wt % to 5 wt % one or more water-soluble or dispersible phosphate esters, based on the total weight of the composition.

In one embodiment, the present invention provides a method of printing a substrate comprising applying a composition of the invention on a substrate, and curing the composition on the substrate.

In another embodiment, the present invention provides a printed substrate comprising the water-based energy curable composition of the invention. In yet another embodiment, the present invention provides an article comprising the printed substrate.

These and other objects, advantages, and features of the invention will become apparent to those persons skilled in the art upon reading the details of the formulations and methods as more fully described below.

DETAILED DESCRIPTION OF THE INVENTION

The present invention provides an energy curable composition comprising an inert water-soluble or water-dispersible polyurethane resin, in combination with a water-soluble or dispersible phosphate ester. Including the inert polyurethane and phosphate combination improves adhesion of the energy curable composition to various substrates for flexographic printing. The energy curable compositions may be technical varnishes, coatings, inks, primers, overprint varnishes, and the like.

It is to be understood that the foregoing general description and the following detailed description are exemplary and explanatory only, and are not restrictive of any subject matter claimed.

Headings are used solely for organizational purposes, and are not intended to limit the invention in any way.

Unless otherwise defined, all technical and scientific terms used herein have the same meaning as is commonly understood by one of skill in the art to which the inventions belong. All patents, patent applications, published applications and publications, websites and other published materials referred to throughout the entire disclosure herein, unless noted otherwise, are incorporated by reference in their entirety for any purpose. Although any methods and materials similar or equivalent to those described herein can be used in the practice or testing of the present invention, the preferred methods are described.

Definitions

In this application, the use of the singular includes the plural unless specifically stated otherwise. As used herein, the singular forms "a," "an" and "the" are intended to include the plural forms as well, unless the context clearly indicates otherwise.

In this application, the use of "or" means "and/or" unless stated otherwise. Also, when it is clear from the context in which it is used, "and" may be interpreted as "or," such as in a list of alternatives where it is not possible for all to be true or present at once.

As used herein, the terms "comprises" and/or "comprising" specify the presence of the stated features, integers, steps, operations, elements, and/or components, but do not preclude the presence or addition of one or more other features, integers, steps, operations, elements, components, and/or groups thereof. Furthermore, to the extent that the terms "includes," "having," "has," "with," "composed," "comprised" or variants thereof are used in either the detailed description or the claims, such terms are intended to be inclusive in a manner similar to the term "comprising."

As used herein, ranges and amounts can be expressed as "about" a particular value or range. "About" is intended to also include the exact amount. Hence "about 5 percent" means "about 5 percent" and also "5 percent." "About" means within typical experimental error for the application or purpose intended.

It is to be understood that wherein a numerical range is recited, it includes the end points, all values within that range, and all narrower ranges within that range, whether specifically recited or not.

Throughout this disclosure, all parts and percentages are by weight (wt % or mass % based on the total weight) and all temperatures are in ° C. unless otherwise indicated.

As used herein, "substrate" means any surface or object to which an ink or coating can be applied. Substrates include, but are not limited to, cellulose-based substrates, paper, paperboard, fabric (e.g. cotton), leather, textiles, felt, concrete, masonry, stone, plastic, plastic or polymer film, spun-bond non-woven fabrics (e.g. consisting of polypropylene, polyester, and the like) glass, ceramic, metal, wood, composites, combinations thereof, and the like. Substrates may have one or more layers of metals or metal oxides, or other inorganic materials. Particularly preferred are non-woven substrates.

As used herein, the term "article" or "articles" means a substrate or product of manufacture. Examples of articles include, but are not limited to: substrates such as cellulose-based substrates, paper, paperboard, plastic, plastic or polymer film, glass, ceramic, metal, composites, and the like; and products of manufacture such as publications (e.g. brochures), labels, and packaging materials (e.g. cardboard sheet or corrugated board), containers (e.g. bottles, cans), a polyolefin (e.g. polyethylene or polypropylene), a polyester (e.g. polyethylene terephthalate), a metalized foil (e.g. laminated aluminum foil), metalized polyester, a metal container, and the like.

As used herein, "inks and coatings," "inks," and "coatings" are used interchangeably, and refer to compositions of the invention, or, when specified compositions found in the prior art (comparative). Inks and coatings typically contain resins, solvent, and, optionally, colorants. Coatings are often thought of as being colorless or clear, while inks typically include a colorant.

As used herein, "water-based" means that a material is water-soluble or water-dispersible.

As used herein, an "inert" material is a material that is not energy curable (e.g. not photoreactive) in the compositions of the invention.

As used herein, "energy-curing" refers to the cure achieved under exposure to various electromagnetic radiation sources producing an actinic effect. Such sources include but are not limited to, electron-beam, UV-light, visible-light, IR, or microwave. Where the compositions are cured under the action of UV light, then non-limiting UV sources such as the following can be used: low pressure mercury bulbs, medium pressure mercury bulbs, a xenon bulb, excimer lamps, a carbon arc lamp, a metal halide bulb, a UV-LED lamp or sunlight. It should be appreciated by those skilled in the art that any UV light source may be used to cure compositions prepared according to the current invention. Compositions of the current invention are especially suited for use in compositions curable under the action of UV light and/or electron-beam. A composition that is "energy-curable" can be cured by actinic radiation.

As used herein, "monomer" refers to a small molecule having one or more functional groups. Monomers react with other monomers, either the same or different, to form monomer chains (oligomers and/or polymers). Each monomer in a chain is a monomer repeating unit. A monomer is the smallest unit that makes up an oligomer or a polymer. A monomer is a low molecular weight molecule, usually less than or equal to 100 Daltons weight average molecular weight ($M_w$).

As used herein, "oligomer" refers to a chain of a few monomer repeating units. Oligomers are a few to several monomer units long chains, and have a mid-range weight average molecular weight of about 100 Daltons to about 10,000 Daltons.

As used herein, "polymer" refers to a large molecule, containing multiple monomer and/or oligomer repeating units. Polymers are high molecular weight molecules, having a weight average molecular weight of greater than about 10,000 Daltons.

As used herein, the terms "opacity" of a pigmented ink or coating refers to its ability to cover the color or color differences of a substrate. Opacity is the property of blocking light. Opacity depends on the amount of light that is transmitted through, or reflected from, the surface of the ink. More opaque colorants block more light (i.e. less light is transmitted through) and have a greater tendency to reflect and refract light.

Compositions and Uses Thereof

An inert water-based polyurethane resin, in combination with a phosphate ester, preferably a water-based phosphate ester, was added to an energy curable flexographic ink to improve adhesion to various substrates. The resulting energy curable flexographic ink with greatly improved adhesion to the substrate preferably contains less than or equal 15 wt % water, based on the total weight of the composition. Consequently, the ink does not require a special/secondary hot air dryer to drive off surface water, thus allowing additional colors to trap or print directly onto the surface of the previously printed ink. Additionally, the water content lowers the viscosity of the ink, resulting in improved printability. The inventive inks exhibit improved adhesion to various films, for example polypropylene and polyester, along with easier clean up, and higher opacity. In a preferred embodiment, the inert water-based polyurethane and water-based phosphate ester are both incorporated into the inks of the present invention, but it would be possible to incorporate either of the two materials (not necessarily both) to produce the improved adhesion and/or opacity.

The energy curable compositions of the present invention also preferably exhibit good flexibility, making them suitable for shrink sleeve label applications.

There are various preferred materials as shown in the examples, but there is no specific limitation on the materials as long as the formulation contains one or more water-based polyurethanes, and one or more water-based phosphate esters.

The compositions of the invention typically comprise about 0.1 wt % to about 15 wt % inert water-based polyurethane resins, based on the total weight of the composition. For example, the inert water-based polyurethane resins may be present in an amount of about 0.1 wt % to about 10 wt %; or about 0.1 wt % to about 5 wt %; or about 0.1 wt % to about 1 wt %; or about 0.1 wt % to about 0.5 wt %; or about 0.5 wt % to about 15 wt %; or about 0.5 wt % to about 10 wt %; or about 0.5 wt % to about 5 wt %; or about 0.5 wt % to about 1 wt %; or about 1 wt % to about 15 wt %; or about 1 wt % to about 10 wt %; or about 1 wt % to about 5 wt %; or about 5 wt % to about 15 wt %; or about 5 wt % to about 10 wt %; or about 10 wt % to about 15 wt %. The amount refers to resin solids in the composition. The water-based polyurethane resins may be provided as a dispersion, having about 10% to about 50% solids.

Suitable inert water-based polyurethanes include, but are not limited to, Sun Chemical WB Polyurethane 9R00-0082 (Sun Chemical), and the like. The water-based inert polyurethane resins preferably have a weight average molecular weight of about 10,000 to 50,000 Daltons. In certain preferred embodiments, the water-based inert polyurethane resins have a weight average molecular weight of 14,000 to 22,000 Daltons.

The energy curable compositions of the invention comprise one or more ethylenically unsaturated monomers, oligomers, or combinations thereof. Oligomers are substances that provide the vehicle for the energy curable compositions. Oligomers are similar to monomers, except that they have already been partially polymerized (i.e. a chain containing two or greater monomer repeating units), which makes them more viscous. During curing, the monomers react with the oligomers to create chains in three dimensions. In the printing industry, mainly resins/oligomers with acrylate functionality are used to provide the necessary reactivity to enable adequate cure for modern, high speed presses. The main classes of acrylated oligomers include epoxy acrylates, urethane acrylates, polyester acrylates, acrylic acrylates, hyperbranched polyester acrylates, waterborne UV polyurethane dispersions, and organic-inorganic hybrid materials.

The energy curable compositions of the invention typically contain about 1 wt % to about 50 wt % monomers and/or oligomers, based on the total weight of the composition. For example, monomers and/or oligomers may be present in an amount of about 1 wt % to about 40 wt %; or about 1 wt % to about 30 wt %; or about 1 wt % to about 20 wt %; or about 1 wt % to about 10 wt %; or about 10 wt % to about 50 wt %; or about 10 wt % to about 40 wt %; or about 10 wt % to about 30 wt %; or about 10 wt % to about 20 wt %.

Examples of suitable monofunctional ethylenically unsaturated monomers include, but are not limited to, the following: isobutyl acrylate; cyclohexyl acrylate; iso-octyl acrylate; n-octyl acrylate; isodecyl acrylate; iso-nonyl acrylate; octyl/decyl acrylate; lauryl acrylate; 2-propyl heptyl acrylate; tridecyl acrylate; hexadecyl acrylate; stearyl acrylate; iso-stearyl acrylate; behenyl acrylate; tetrahydrofurfuryl acrylate; 4-t.butyl cyclohexyl acrylate; 3,3,5-trimethyl-cyclohexane acrylate; isobornyl acrylate; dicyclopentyl acrylate; dihydrodicyclopentadienyl acrylate; dicyclopentenyloxyethyl acrylate; dicyclopentanyl acrylate; benzyl acrylate; phenoxyethyl acrylate; 2-hydroxy-3-phenoxypropyl acrylate; alkoxylated nonylphenol acrylate; cumyl phenoxyethyl acrylate; cyclic trimethylolpropane formal acrylate; 2(2-ethoxyethoxy) ethyl acrylate; polyethylene glycol monoacrylate; polypropylene glycol monoacrylate; caprolactone acrylate; ethoxylated methoxy polyethylene glycol acrylate; methoxy triethylene glycol acrylate; tripropyleneglycol monomethyl ether acrylate; diethyleneglycol butyl ether acrylate; alkoxylated tetrahydrofurfuryl acrylate; ethoxylated ethyl hexyl acrylate; alkoxylated phenol acrylate; ethoxylated phenol acrylate; ethoxylated nonyl phenol acrylate; propoxylated nonyl phenol acylate; polyethylene glycol o-phenyl phenyl ether acrylate; ethoxylated p-cumyl phenol acrylate; ethoxylated nonyl phenol acrylate; alkoxylated lauryl acrylate; ethoxylated tristyrylphenol acrylate; N-(acryloyloxyethyl)hexahydrophthalimide; N-butyl 1,2 (acryloyloxy) ethyl carbamate; acryloyl oxyethyl hydrogen succinate; octoxypolyethylene glycol acrylate; octafluoropentyl acrylate; 2-isocyanato ethyl acrylate; acetoacetoxy ethyl acrylate; 2-methoxyethyl acrylate; dimethyl aminoethyl acrylate; 2-carboxyethyl acrylate; 4-hydroxy butyl acrylate; combinations thereof, and the like. As used herein, the term ethoxylated refers to chain extended compounds through the use of ethylene oxide, propoxylated refers to chain extended compounds through the use of propylene oxide, and alkoxylated refers to chain extended compounds using either or both ethylene oxide and propylene oxide. Equivalent methacrylate compounds are also capable of being used, although those skilled in the art will appreciate that methacrylate compounds have lower reactivity than their equivalent acrylate counterparts:

Examples of suitable multifunctional ethylenically unsaturated monomers include but are not limited to the following: 1,3-butylene glycol diacrylate; 1,4-butanediol diacrylate; neopentyl glycol diacrylate; ethoxylated neopentyl glycol diacrylate; propoxylated neopentyl glycol diacrylate; 2-methyl-1,3-propanediyl ethoxy acrylate; 2-methyl-1,3-propanediol diacrylate; ethoxylated 2-methyl-1,3-propanediol diacrylate; 3 methyl 1,5-pentanediol diacrylate; 2-butyl-2-ethyl-1,3-propanediol diacrylate; 1,6-hexanediol diacrylate; alkoxylated hexanediol diacrylate; ethoxylated hexanediol diacrylate; propoxylated hexanediol diacrylate; 1,9-nonanediol diacrylate; 1,10 decanediol diacrylate; ethoxylated hexanediol diacrylate; alkoxylated hexanediol diacrylate; diethyleneglycol diacrylate; triethylene glycol diacrylate; tetraethylene glycol diacrylate; polyethylene glycol diacrylate; propoxylated ethylene glycol diacrylate; dipropylene glycol diacrylate; tripropyleneglycol diacrylate; polypropylene glycol diacrylate; poly (tetramethylene glycol) diacrylate; cyclohexane dimethanol diacrylate; ethoxylated cyclohexane dimethanol diacrylate; alkoxylated cyclohexane dimethanol diacrylate; polybutadiene diacrylate; hydroxypivalyl hydroxypivalate diacrylate; tricyclodecanedimethanol diacrylate; 1,4-butanediylbis[oxy(2-hydroxy-3,1-propanediyl)]diacrylate; ethoxylated bisphenol A diacrylate; propoxylated bisphenol A diacrylate; propoxylated ethoxylated bisphenol A diacrylate; ethoxylated bisphenol F diacrylate; 2-(2-vinyloxyethoxy)ethyl acrylate; dioxane glycol diacrylate; ethoxylated glycerol triacrylate; glycerol propoxylate triacrylate; pentaerythritol triacrylate; trimethylolpropane triacrylate; caprolactone modified trimethylol propane triacrylate; ethoxylated trimethylolpropane triacrylate; propoxylated trimethylol propane triacrylate; tris (2-hydroxyethyl) isocyanurate triacrylate; e-caprolactone modified tris (2-hydroxy ethyl) isocyanurate triacrylate; melamine acrylate oligomer; pentaerythritol tetraacrylate; ethoxylated pentaerythritol tetraacrylate; di-trimethylolpropane tetra acrylate; dipentaerythritol pentaacrylate; dipentaerythritol hexaaacrylate; ethoxylated dipentaerythritol hexaacrylate; combinations thereof, and the like. The term ethoxylated refers to chain extended compounds through the use of ethylene oxide, propoxylated refers to chain extended compounds through the use of propylene oxide, and alkoxylated refers to chain extended compounds using either or both ethylene oxide and propylene oxide. Equivalent methacrylate compounds are also capable of being used, although those skilled in the art will appreciate that methacrylate compounds have lower reactivity than their equivalent acrylate counterparts.

Other functional monomer classes capable of being used in part in these formulations include cyclic lactam such as N-vinyl caprolactam; N-vinyl oxazolidinone and N-vinyl pyrrolidone, and secondary or tertiary acrylamides such as N-acryloyl morpholine; diacetone acrylamide; N-methyl acrylamide; N-ethyl acrylamide; N-isopropyl acrylamide; N-t-butyl acrylamide; N-hexyl acrylamide; N-cyclohexyl acrylamide; N-octyl acrylamide; N-t-octyl acrylamide; N-dodecyl acrylamide; N-benzyl acrylamide; N-(hydroxymethyl)acrylamide; N-isobutoxymethyl acrylamide; N-butoxymethyl acrylamide; N,N-dimethyl acrylamide; N,N-diethyl acrylamide; N,N-propyl acrylamide; N,N-dibutyl acrylamide; N,N-dihexyl acrylamide; N,N-dimethylamino methyl acrylamide; N,N-dimethylamino ethyl acrylamide; N,N-dimethylamino propyl acrylamide; N,N-dimethylamino hexyl acrylamide; N,N-diethylamino methyl acrylamide; N,N-diethylamino ethyl acrylamide; N,N-diethylamino propyl acrylamide; N,N-dimethylamino hexyl acrylamide; and N,N'-methylenebisacrylamide.

The energy curable compositions of the present invention can be ultraviolet (UV)-cured by an actinic light source, such as, for example, UV light, provided by a high-voltage mercury bulb, a medium-voltage mercury bulb, a xenon bulb, a carbon arc lamp, a metal halide bulb, a UV-LED lamp or sunlight. The wavelength of the applied irradiation is preferably within a range of about 200 to 500 nm, more preferably about 250 to 350 nm. UV energy is preferably within a range of about 30 to 3000 mJ/cm$^2$, and more preferably within a range of about 50 to 500 mJ/cm$^2$. In addition, the bulb can be appropriately selected according to the absorption spectrum of the radiation curable composition. Moreover, the inks of this invention can be cured under inert conditions.

Alternatively, the radiation curable compositions and inks of this invention can be cured by electron beam (EB). Commercially EB-dryers are available for example from Energy Science, Inc. of Wilmington, Mass., or from Advanced Electron Beams Inc. (AEB) of Wilmington, Mass. The energy absorbed, also known as the dose, is measured in units of kiloGrays (kGy), one kGy being equal to 1,000 Joules per kilogram. Usually, the electron beam dose should be within the range of 10 kGy to about 40 kGy for complete curing. With the radiation curable composition of this invention a radiation dose of 20-30 kGy at an oxygen level of <200 ppm is usually sufficient to get a dry, solvent resistant coating or ink.

When cured by UV radiation, the energy curable compositions of the invention may contain one or more photoinitiators. When present, the photoinitiators are typically present in an amount of about 0.1 wt % to about 8 wt %, based on the total weight of the composition. For example, the photoinitiators may be present in an amount of about 0.1 wt % to about 5 wt %; or about 1 wt % to about 8 wt %; or about 1 wt % to about 5 wt %.

There is no restriction on the type, blend or concentration of photoinitiator used and can include any suitable type of photoinitiators, such as, but not limited to: α-hydroxyketones, acyl phosphine oxides, α-aminoketones, thioxanthones, benzophenones, phenylglyoxylates, oxime esters, and combinations thereof.

Suitable α-hydroxyketones include, but are not limited to: 1-hydroxy-cyclohexyl-phenyl-ketone; 2-hydroxy-2-methyl-1-phenyl-1-propanone; 2-hydroxy-2-methyl-4'-tert-butyl-propiophenone; 2-hydroxy-4'-(2-hydroxyethoxy)-2-methyl-propiophenone; 2-hydroxy-4'-(2-hydroxypropoxy)-2-methyl-propiophenone; oligo 2-hydroxy-2-methyl-1-[4-(1-methyl-vinyl)phenyl]propanone; bis[4-(2-hydroxy-2-methylpropionyl)phenyl]methane; 2-hydroxy-1-[1-[4-(2-hydroxy-2-methylpropanoyl)phenyl]-1,3,3-trimethylindan-5-yl]-2-methylpropan-1-one; 2-hydroxy-1-[4-[4-(2-hydroxy-2-methylpropanoyl)phenoxy]phenyl]-2-methylpropan-1-one; and combinations thereof.

Suitable acylphosphine oxides include, but are not limited to: 2,4,6-trimethylbenzoyl-diphenylphosphine oxide; ethyl-(2,4,6-trimethylbenzoyl)phenyl phosphinate; bis-(2,4,6-trimethylbenzoyl)-phenylphosphine oxide; and combinations thereof.

Suitable α-aminoketones include, but are not limited to: 2-methyl-1-[4-(methylthio)phenyl]-2-morpholinopropan-1-one; 2-benzyl-2-dimethylamino-1-(4-morpholinophenyl)-butan-1-one; 2-dimethylamino-2-(4-methyl-benzyl)-1-(4-morpholin-4-yl-phenyl)-butan-1-one; and combinations thereof.

Suitable thioxanthones include, but are not limited to: 2-4-diethylthioxanthone, isopropylthioxanthone, 2-chloro-thioxanthone, and 1-chloro-4-propoxythioxanthone; and combinations thereof.

Suitable benzophenones include, but are not limited to: benzophenone, 4-phenylbenzophenone, and 4-methylbenzophenone; methyl-2-benzoylbenzoate; 4-benzoyl-4-methyl-diphenyl sulphide; 4-hydroxybenzophenone; 2,4,6-trimethyl benzophenone, 4,4-bis(diethylamino)benzophenone; benzophenone-2-carboxy(tetraethoxy)acrylate; 4-hydroxybenzophenone laurate; 1-[-4-[benzoylphenylsulpho]phenyl]-2-methyl-2-(4-methylphenylsulphonyl)propan-1-one; and combinations thereof.

Suitable phenylglyoxylates include, but are not limited to: phenyl glyoxylic acid methyl ester; oxy-phenyl-acetic acid 2-[hydroxyl-ethoxy]-ethyl ester; oxy-phenyl-acetic acid 2-[2-oxo-2-phenyl-acetoxy-ethoxy]-ethyl ester; and combinations thereof.

Suitable oxime esters include, but are not limited to: 1-phenyl-1,2-propanedione-2-(O-ethoxycarbonyl)oxime; [1-(4-phenyl sulfanylbenzoyl)heptylideneamino]benzoate; [1-[9-ethyl-6-(2-methylbenzoyl)carbazol-3-yl]-ethylideneamino]acetate; and combinations thereof.

Examples of other suitable photoinitiators include diethoxy acetophenone; benzil; benzil dimethyl ketal; titanocen radical initiators such as titanium-bis(n 5-2,4-cyclopentadien-1-yl)-bis-[2,6-difluoro-3-(1H-pyrrol-1-yl) phenyl]; 9-fluorenone; camphorquinone; 2-ethyl anthraquinone; and the like.

An amine synergist, may also optionally be included in the formulation. Suitable examples include, but are not limited to: aromatic amines, such as 2-(dimethylamino) ethylbenzoate; N-phenyl glycine; benzoic acid, 4-(dimethylamino)-, 1,1'-[(methylimino)di-2,1-ethanediyl] ester; and simple alkyl esters of 4-(N,N-dimethylamino)benzoic acid and other positional isomers of N,N-dimethylamino)benzoic acid esters, with ethyl, amyl, 2-butoxyethyl and 2-ethylhexyl esters being particularly preferred; aliphatic amines, such as such as N-methyldiethanolamine, triethanolamine and tri-isopropanolamine; aminoacrylates and amine modified polyether acrylates, such as EBECRYL 80, EBECRYL 81, EBECRYL 83, EBECRYL 85, EBECRYL 880, EBECRYL LEO 10551, EBECRYL LEO 10552, EBECRYL LEO 10553, EBECRYL 7100, EBECRYL P115 and EBECRYL P116 available from ALLNEX; CN501, CN550, CN UVA421, CN3705, CN3715, CN3755, CN381 and CN386, all available from Sartomer; GENOMER 5142, GENOMER 5161, GENOMER 5271 and GENOMER 5275 from RAHN; PHOTOMER 4771, PHOTOMER 4967, PHOTOMER 5006, PHOTOMER 4775, PHOTOMER 5662, PHOTOMER 5850, PHOTOMER 5930, and PHOTOMER 4250 all available from IGM, LAROMER LR8996, LAROMER LR8869, LAROMER LR8889, LAROMER LR8997, LAROMER PO 83F, LAROMER PO 84F, LAROMER PO 94F, LAROMER PO 9067, LAROMER PO 9103, LAROMER PO 9106 and LAROMER PO77F, all available from BASF; AGISYN 701, AGISYN 702, AGISYN 703, NeoRad P-81 and NeoRad P-85 all available from DSM-AGI.

Polymeric photoinitiators and sensitizers are also suitable, including, for example, polymeric aminobenzoates (GENOPOL AB-1 or AB-2 from RAHN; Omnipol ASA from IGM or Speedcure 7040 from Lambson), polymeric benzophenone derivatives (GENOPOL BP-1 or BP-2 from RAHN; Omnipol BP, Omnipol BP2702 or Omnipol 682 from IGM or Speedcure 7005 from Lambson); polymeric thioxanthone derivatives (GENOPOL TX-1 or TX-2 from RAHN, Omnipol TX from IGM or Speedcure 7010 from Lambson); polymeric aminoalkylphenones such as Omnipol 910 from IGM; polymeric benzoyl formate esters such as Omnipol 2712 from IGM; and the polymeric sensitizer Omnipol SZ from IGM.

The energy curable compositions of the present invention may include one or more additional resins. Such resins include, but are not limited to, alkyds, phenolics, nitrocellulose, polyamides, vinyls, acrylics, rosin esters, hydrocarbons, polyurethane, epoxies, polyesters, styrenes, urea, melamine-formaldehydes, combinations thereof, and the like. In certain embodiments, the energy curable compositions of the invention contain additional resins having a weight average molecular weight of 1000-30,000 Daltons, preferred 1000-4000 Daltons, and include poly(acrylates), poly(ester), poly(urethanes), poly(amides) ketone resins, aldehyde resins, alkyd resins, phenol-formaldehyde resins, rosin resins, hydrocarbon resins, alkyd resins or mixtures of the aforementioned. In certain embodiments, one or more of the additional resins may be inert. Such resins improve pigment wetting, gloss, rheology and flexibility.

The radiation curable compositions and inks of this invention may contain the usual additives to modify flow, surface tension, gloss and abrasion resistance of the cured coating or printed ink. These additives may function as leveling agents, in-can stabilizers, wetting agents, slip agents, flow agents, dispersants and de-aerators. Preferred additives include fluorocarbon surfactants, silicones and organic polymer surfactants and inorganic materials such as talc, and combinations thereof. As examples, the Tegorad product lines (Tegorad are trademarks and are commercially available products of Tego Chemie, Essen, Germany) and the Solsperse product lines (Solsperse are trademarks and are commercially available products of Lubrizol Company). When present, additives are typically present in an amount of about 0.1 wt % to about 5 wt %, based on the total weight of the composition.

The energy curable compositions and inks of this invention may contain the usual extenders such as clay, talc, calcium carbonate, magnesium carbonate or silica to adjust, for example, misting and color strength. When present, the extenders are each individually present in an amount of about 0.1 wt % to about 20 wt %, preferably about 0.1 wt % to about 10 wt %, based on the total weight of the composition.

In certain embodiments, the energy curable compositions of the invention may comprise one or more colorants. There is no particular limitation on the colorants. The colorants may be organic or inorganic pigments, or dyes. The dyes include but are not limited to fluorescent dyes, azo dyes, anthraquinone dyes, xanthene dyes, azine dyes, combinations thereof, and the like. Organic pigments may be one pigment or a combination of pigments, such as for instance Pigment Yellow Numbers 12, 13, 14, 17, 74, 83, 114, 126, 127, 174, 188; Pigment Red Numbers 2, 22, 23, 48:1, 48:2, 52, 52:1, 53, 57:1, 112, 122, 166, 170, 184, 202, 266, 269; Pigment Orange Numbers 5, 16, 34, 36; Pigment Blue Numbers 15, 15:3, 15:4; Pigment Violet Numbers 3, 23, 27; and/or Pigment Green Number 7. Inorganic pigments may be one of the following non-limiting pigments: iron oxides, titanium dioxides, chromium oxides, ferric ammonium ferrocyanides, ferric oxide blacks, Pigment Black Number 7 and/or Pigment White Numbers 6 and 7. Other organic and inorganic pigments and dyes can also be employed, as well as combinations that achieve the colors desired.

EXAMPLES

The invention is further described by the following non-limiting examples which further illustrate the invention, and are not intended, nor should they be interpreted to, limit the scope of the invention.

Methods

Press Runnability/Printability

Example 1 and 2 inks were run on a Kopack flexographic press using the following conditions:
  Press speed: 500 feet per minute (152.4 m/minute)
  Cured by UV and LED
  LED lights: Aradiant 30 watts 385 NM
  UV light: Prime UV 600 watts
  Substrate: corona treated (2.0 Milliamps) polypropylene
  Plate material: photopolymer
  Stick-Back: Lohmann
  Doctor Blade: Allison Blue Steel
  Anilox Roll:
  Day 1—180 1 s 10 bcm
  Day 2—300 1 s 7 bcm Prints were gauged for defects in either solid or tone areas. Printability was assessed by looking at the print for a smooth, even color at the correct color density. Example 1 and 2 inks exhibited good runnability and printability, comparable to or better than standard inks.

Lab Printing—Used for Adhesion and Opacity Testing

Examples 1 and 2, and comparative inks were applied to various substrates with a Harper Scientific Phantom QD System, using a flexographic bladed anilox roller of 165 line/10.5 bcm. Prints were cured using a UVEXS model #15645-6 from UVEXS Incorporated (CA, 94086) at a dose of 110 to 111 mJ/cm$^2$. Example 1 ink was printed on polypropylene. Example 2 ink was printed on metallized and clear polyester. Standard comparative inks were printed on polypropylene.

Tape Adhesion

Lab printed samples (see method above) were prepared. Example 1 ink was printed on polypropylene, and compared to standard inks printed on polypropylene. Example 2 ink was printed on metallized and clear polyester, and compared to standard inks printed on metallized and clear polyester. The printed and dried samples were placed on a hard surface. Tape was affixed to the dried print, using moderate to heavy finger pressure against the hard surface to provide a good seal. The tape was pulled from the print at an angle of 45° using a fast pull, with the print supported by holding it taut against the hard surface with thumb and forefinger. The tape adhesion test was conducted with three different tapes for each print: 810 tape, 610 tape, and 600 tape (all from 3M). The amount of ink removed was assessed on a scale of 1 to 5, with the following criteria:

1=greater than 80% ink removal (fail)
2=40% to 80% ink removal (fail)
3=20% to 40% ink removal (poor)
4=5% to 20% ink removal (good)
5=0% to 5% ink removal (excellent)

Opacity

Opacity of the cured printed ink or coating composition on a substrate was measured using a BNL-3 opacimeter (Technidye Corporation, New Albany, Ind., USA). Lab print samples were prepared as described above. Once cured, the opacity of the cured printed ink was measured. The opacity of Example 1 ink, and the standard comparative inks, printed on polypropylene was measured. The BNL-3 opacimeter was calibrated, using a reading of 100 with a standard white body and 0 with a standard black body indicating proper calibration. Five measurements of each sample were taken and averaged. The opacity was reported as % opacity The acceptability of the opacity of the printed inks was assessed on a scale of 1 to 5 as follows:

1=poor/fail
2-3=poor
4-5=good/excellent

Wash-Up

Wash-up is a measure of how easily inks can be cleaned off of equipment after a print run on a commercial press. Wash-up is assessed by the print crew, and wash-up is rated as either acceptable or unacceptable. Only inks which to do not cause any excess downtime to normal production are deemed acceptable.

Lab prints were made with a freshly cleaned (sonicated) 165 line/10 bcm anilox roller. After printing, the anilox roller was immediately submerged in in a proofer bath of isopropyl alcohol (IPA), and the anilox roller was rolled back and forth up to 10 times. Excess IPA was removed with a clean lab wipe, and a picture was taken of the result. Wash-up was assessed by the amount of ink remaining on the roller. Wash-up was rated on a scale of 1 to 5 as follows:

1=ink remained on 90-100% of the roller area (fail)
2=ink remained on 60-90% of the roller area (fail)
3=ink remained on 30-60% of the roller area (poor)
4=ink remained on 10-30% of the roller area (good)
5=ink remained on 0-10% of the roller area (excellent)

Examples 1 and 2. Inventive Inks

Example 1 is an ink formulated for adhesion to polypropylene, and the formulation is shown in Table 1.

TABLE 1

Example 1 ink for adhesion to polypropylene

| MATERIALS | wt % |
|---|---|
| Sartomer CN132 | 13.25 |
| Sun Chemical WB Polyurethane 9R00-0082 | 7.50 |
| Rahn Miramer M280 | 13.70 |
| BYK Disperbyk-111 | 1.00 |
| IGM Resins Omnirad TPO-L | 2.00 |
| IGM Resins Omnirad 4265 | 3.40 |
| Allnex Ebecryl 7100 | 1.00 |
| TR-52 Henan | 53.00 |
| Evonik Sipernat 820 A | 0.50 |
| Stepan StepCote W877 | 1.25 |
| Tap Water | 3.40 |
| TOTAL | 100 |

Sartomer CN132: aliphatic diacrylate oligomer
Sun Chemical WB Polyurethane 9R00-0082—a water-based inert polyurethane resin dispersion:
  36% to 37.5% solids (% TNV)
  Viscosity of 450-1000 centipoise (tested using a Brookfield viscometer, spindle #3, at 60 rpm and 25° C.)
  pH of 8.0 to 9.5
  Turbidity of less than 10 [lab standard] NTUs [Nephelometric Turbidity Units]
  (LaMotte 2020we Turbidimeter)
Rahn Miramer M280: PEG 400 diacrylate monomer
BYK Disperbyk-111: wetting agent
IGM Resins Omnirad TPO-L: Ethyl (2, 4, 6-trimethyl-benzoyl)-phenyl-phosphinate (photoinitiator)
IGM Resins Omnirad 4265: Blend of 2, 4, 6-trimethyl-benzoyl-diphenyl-phosphine oxide (50%) and 2-hydroxy-2-methyl-1-phenylpropanone (50%) (photoinitiator)
Allnex Ebecryl 7100: acrylated amine
TR-52 Henan: titanium dioxide ($TiO_2$)
Evonik Sipernat 820 A: precipitated synthetic silicate
Stepan StepCote W877: neutralized alcohol phosphate (phosphate ester)

Example 2 ink is an ink formulation for adhesion to polyester. The formulation of Example 2 is shown in Table 2.

TABLE 2

Example 2 ink for adhesion to polyester

| MATERIALS | wt % |
|---|---|
| Sartomer CN132 | 25.50 |
| Sun Chemical WB Polyurethane 9R00-0082 | 7.50 |
| Rahn Miramer M280 | 2.00 |
| BYK Disperbyk-111 | 1.00 |
| IGM Resins Omnirad TPO-L | 7.00 |
| TR-52 Henan | 53.00 |
| Stepan StepCote W877 | 2.00 |
| Tap Water | 2.00 |
| TOTAL | 100 |

The following were used as comparative inks:
Competitor's ink=standard ink
Max D=FLNFV1482594 MAXD OPAQUE WHITE (Sun Chemical)
Platinum=PLATINUM-100 UV FLEXO PLATINUM WHITE 100 (Sun Chemical)
Neutron=FD47 Neutron White (Sun Chemical)

Example 3. Testing of Inventive Examples 1 and 2 and Comparative Inks

The printed inks were assessed as described above. The results are presented in Tables 3 to 5 below.

TABLE 3

Tape adhesion rating

|  | Polypropylene | Metallized Polyester | Clear Polyester |
| --- | --- | --- | --- |
| Example 1 | 5 | n/a | n/a |
| Example 2 | n/a | 5 | 5 |
| Competitor's ink | 2 | n/a | n/a |
| Max D | 1 | n/a | n/a |
| Platinum | 3 | n/a | n/a |
| Neutron | 1 | n/a | n/a | n/a = not tested

Example 1 ink shows excellent adhesion to polypropylene film substrate, and is significantly better than standard, comparative inks. Example 2 ink shows excellent adhesion to both metallized and clear polyester.

TABLE 4

Opacity

|  | Opacity (%) | Rating |
| --- | --- | --- |
| Example 1 | 68.3 | 4.5 |
| Example 2 | n/a | n/a |
| Competitor's ink | 67.1 | 3 |
| Max D | 64.3 | 1 |
| Platinum | 63.4 | 1 |
| Neutron | 66.3 | 2 |

Example 1 ink exhibited better opacity than the standard comparative inks.

TABLE 5

Wash-up

|  | Wash-up rating |
| --- | --- |
| Example 1 | 4 |
| Example 2 | n/a |
| Competitor's ink | 2 |
| Max D | 2 |
| Platinum | 1 |
| Neutron | 2 |

The results in Table 7 show that Example 1 ink was much easier to clean from the anilox roller than the standard comparative inks.

The present invention has been described in detail, including the preferred embodiments thereof. However, it will be appreciated that those skilled in the art, upon consideration of the present disclosure, may make modifications and/or improvements on this invention that fall within the scope and spirit of the invention.

What is claimed:

1. A water-based energy curable composition, comprising:
   (a) 1 wt % to 15 wt % total water from all sources, including added water and water from the materials, based on the total weight of the composition;
   (b) 1 wt % to 50 wt % one or more energy curable monomers and/or oligomers, based on the total weight of the composition;
   (c) 0.1 wt % to 15 wt % one or more water-soluble or dispersible inert polyurethane resins, based on the total weight of the composition; and
   (d) 0.1 wt % to 5 wt % one or more water-soluble or dispersible phosphate esters, based on the total weight of the composition.

2. The composition of claim 1, comprising 0.1 wt % to 12 wt % one or more water-based inert polyurethane resins, based on the total weight of the composition.

3. The composition of claim 1, comprising 0.1 wt % to 4.5 wt % one or more water-based phosphate esters, based on the total weight of the composition.

4. The composition of claim 1, wherein at least one water-based phosphate ester is a $C_1$-$C_8$ alkyl phosphate.

5. The composition of claim 1, comprising 0.1 wt % to 10 wt % one or more water-based inert polyurethane resins, and 0.1 wt % to 4 wt % one or more water-based phosphate esters.

6. The composition of claim 1, wherein at least one water-based phosphate ester is 2-ethylhexyl phosphate.

7. The composition of claim 1, wherein the inert polyurethane resin has a weight average molecular weight of 14,000 to 22,000 Daltons.

8. The composition of claim 1, further comprising 0.1 wt % to 8 wt % one or more photoinitiators, based on the total weight of the composition.

9. The composition of claim 1, further comprising 0.1 wt % to 60 wt % one or more colorants, based on the total weight of the composition.

10. The composition of claim 1, further comprising one or more additives, selected from the group consisting of flow agents, surface active agents, wetting agents, leveling agents, in-can stabilizers, slip agents, surfactants, dispersants, de-aerators, and combinations thereof; wherein each additive is independently present in an amount of 0.1 wt % to 5 wt %, based on the total weight of the composition.

11. The composition of claim 1, further comprising 0.1 wt % to 10 wt % one or more extenders, based on the total weight of the composition.

12. The composition of claim 1, which is an ink or coating composition.

13. The composition of claim 1, which is suitable for flexographic printing.

14. The composition of claim 1, which is curable by exposure to electron beam radiation or UV light.

15. The composition of claim 14, wherein the UV light is provided by a high-voltage mercury bulb, a medium-voltage mercury bulb, a xenon bulb, a carbon arc lamp, a metal halide bulb, a UV-LED lamp, or sunlight.

16. A printed substrate comprising the composition of claim 1.

17. An article comprising the printed substrate of claim 16.

18. A method of printing a substrate, comprising:
   (a) providing a substrate;
   (b) providing the composition of claim 1;
   (c) applying the composition on the substrate; and
   (d) curing the composition on the substrate.

* * * * *